United States Patent [19]
Kershaw

[11] 3,977,003
[45] Aug. 24, 1976

[54] CONFORMAL HELMET ANTENNA

[75] Inventor: Joseph E. Kershaw, La Mesa, Calif.

[73] Assignee: The United States of America as represented by the Secretary of the Navy, Washington, D.C.

[22] Filed: Oct. 15, 1974

[21] Appl. No.: 514,334

[52] U.S. Cl. .................................. 343/702; 343/718
[51] Int. Cl.² .................................................. H01Q 1/24
[58] Field of Search ........... 325/310; 343/718, 720, 343/702, 802, 812, 814

[56] References Cited
UNITED STATES PATENTS

| | | | |
|---|---|---|---|
| 2,602,892 | 7/1952 | Koch | 343/702 |
| 2,904,645 | 9/1959 | Sarles | 343/718 X |
| 3,266,042 | 8/1966 | Mahoney et al. | 343/718 |
| 3,582,951 | 6/1971 | Altmayer | 343/718 |

*Primary Examiner*—Paul L. Gensler
*Attorney, Agent, or Firm*—R. S. Sciascia; G. J. Rubens; H. Fendelman

[57] ABSTRACT

An antenna which conforms to the surface of a nonmetallic helmet for man-on-the-move communications. A metallic electronics housing mounted on the helmet and judiciously arranged antenna fingers comprise the radiating structure which is operable over a wide band of frequencies without tuning.

4 Claims, 4 Drawing Figures

U.S. Patent  Aug. 24, 1976  3,977,003
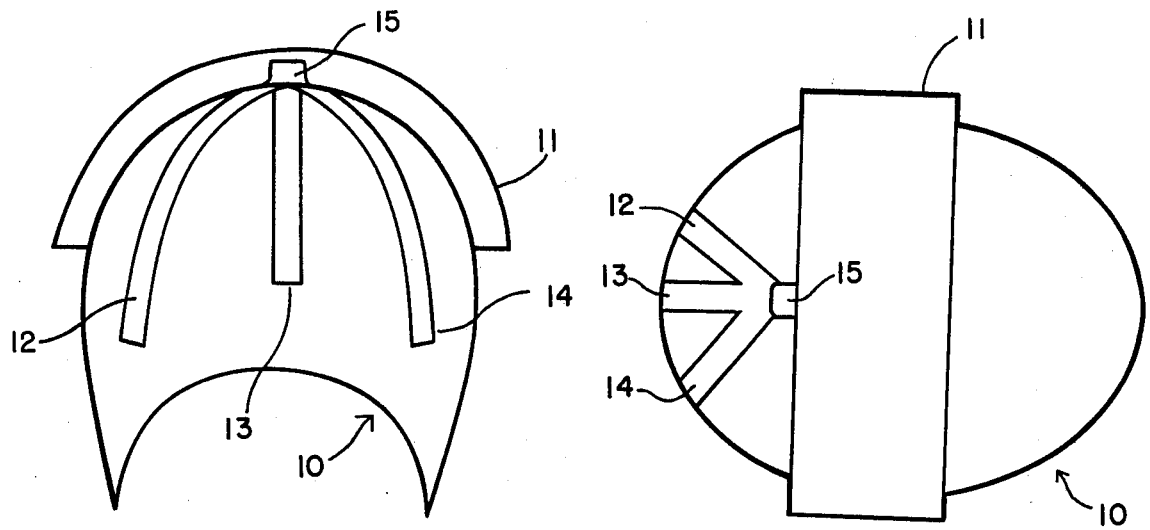
FIG. 1
FIG. 2
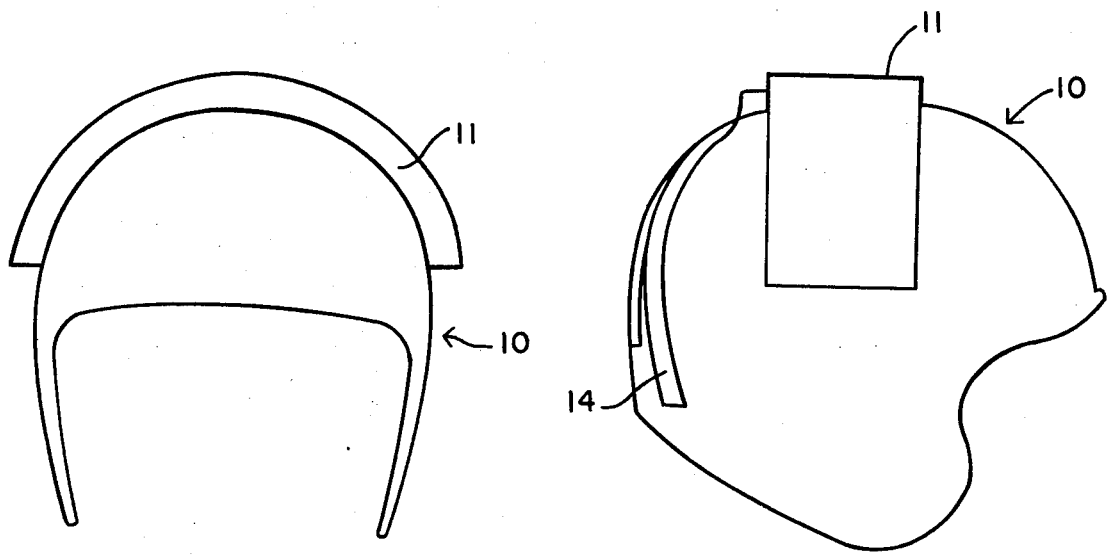
FIG. 3
FIG. 4

CONFORMAL HELMET ANTENNA

BACKGROUND OF THE INVENTION

Various activities such as voice communications aboard aircraft carriers require the use of a communications helmet for communicating to other helmet units or to other fixed or portable units. Previous helmet-antennas utilized antennas which projected outward from the helmet and as a result were hazardous to personnel, tended to damage other equipment and created maintenance problems due to wear and breakage. Other helmet-antennas have been designed which are conformal to the helmet but are extremely narrow band antennas requiring retuning each time the operating frequency is changed and/or are so designed as to require a belt-clipped or other similar separate transmitter-receiver unit.

SUMMARY OF THE INVENTION

According to the present invention, a novel antenna which conforms to the surface of a non-metallic helmet is disclosed. The antenna operates over a wide band of frequencies without tuning and has both vertical and horizontal components. The helmet-antenna of the present invention is an extremely simple structure with a minimal number of joints thereby reducing the possibility of failure and breakage and has an efficiency within 1.5 db of the top loaded helix, which is much higher than any prior art conformal antenna. The antenna design of the present invention is suitable for any existing helmet, moreover, since the radiating elements can be positioned on the exterior of the helmet without modification to the helmet.

STATEMENT OF THE OBJECTS OF THE INVENTION

It is the primary object of the present invention to disclose a novel helmet-antenna.

It is another object of the present invention to disclose a novel conformal helmet-antenna which is simple in structure, inexpensive to manufacture and extremely rugged.

Other objects, advantages and novel features of the invention will become apparent from the following detailed description of the invention when considered in conjunction with the accompanying drawings.

BRIEF DESCRIPTION OF THE DRAWINGS

FIG. 1 is a rear view of the helmet-antenna of the present invention.

FIG. 2 is a top view of the helmet-antenna of the present invention.

FIG. 3 is a front view of the helmet-antenna of the present invention.

FIG. 4 is a side view of the helmet-antenna of the present invention.

DESCRIPTION OF THE PREFERRED EMBODIMENT

The conformal helmet-antenna of the present invention is illustrated in FIGS. 1, 2, 3 and 4. Helmet 10 is made of a non-metallic material such as polycarbonate. Securely mounted by suitable means to helmet 10 and conforming to the shape of helmet 10 is metallic housing 11 which is used for enclosing the required transmitter-receiver electronics and is part of the radiating structure of the antenna. Antenna fingers 12, 13 and 14 which may, for example, be sprayed copper or copper-foil adhesively-bonded to the helmet surface converge at a single point adjacent housing 11, diverge outwardly therefrom and are illustrated as extending downwardly along the rear portion of the helmet 10. The fingers 12, 13, and 14 along with the metallic housing 11 form the radiating structure of the antenna. Insulative housing 15 encloses the reactive compensation element for tuning the antenna and is illustrated as being positioned between the antenna fingers 12, 13 and 14 and the housing 11, although the reactive compensation element and insulative housing could be enclosed within the metallic housing 11. Location and width of the antenna fingers 12, 13 and 14 affect the bandwidth, antenna pattern, and coupling to the wearer, while the reactive compensation element 15 improves the VSWR over the operating bandwidth. Although housing 11 has been illustrated as being positioned on the top of helmet 10 it is to be understood that it is within the scope of the present invention, that housing 11 could be conformally mounted anywhere on the exterior surface of the helmet, the important consideration being that antenna fingers 12, 13 and 14 converge at a point adjacent the housing 11 and diverge therefrom, e.g., housing 11 could be mounted on the back of the helmet with fingers 12, 13 and 14 diverging from the housing towards the front of the helmet or the housing 11 could be mounted on the side of the helmet with the fingers diverging from the housing from one side of the helmet to the other.

According to the present invention, no tuning is required for frequency changes within the band and the antenna can readily be modified to account for changes in helmet shape or materials. Moreover, the low profile of the disclosed helmet-antenna results in minimization of hazards to personnel and damage to other equipment and elimination of maintenance problems due to broken antennas caused by snagging on other objects. Further, the antenna provides complex polarization compatible with an environment in which multiple reflections occur such as on ships. As a result of the unique combination of a radiating electronics housing and the illustrated antenna-finger configuration, the antenna-helmet disclosed herein is a broad band structure, approximately 50 to 100 MHz, which does not require tuning every time the operating frequency is changed.

Obviously many modifications and variations of the present invention are possible in the light of the above teachings. It is therefore to be understood that within the scope of the appended claims the invention may be practiced otherwise than as specifically described.

What is claimed is:
1. In a non-metallic helmet, an antenna comprising:
   a metallic housing for enclosing transmitter-receiver electronics mounted on the exterior of said helmet;
   a plurality of elongated metallic fingers bonded to the outer surface of said helmet and conforming to the shape of said helmet;
   all of said fingers being physically connected at a single point adjacent to said housing and diverging outwardly therefrom, said fingers being operably coupled to said housing;
   whereby said housing and said fingers form a broad band radiating structure with mixed polarization.
2. The structure of claim 1 wherein there are three of said plurality of fingers.
3. The apparatus of claim 1 further including a reactive compensation element connected to said radiating structure.
4. The apparatus of claim 1 wherein said plurality of fingers diverge rearwardly and downwards from said point adjacent to said housing.

* * * * *